July 23, 1963  V. M. GWYTHER  3,098,360
WATER QUALITY CONTROL MEANS
Filed Nov. 14, 1960  7 Sheets-Sheet 1

INVENTOR
VAL M. GWYTHER

INVENTOR
VAL M. GWYTHER

July 23, 1963   V. M. GWYTHER   3,098,360
WATER QUALITY CONTROL MEANS
Filed Nov. 14, 1960   7 Sheets-Sheet 4

INVENTOR
VAL M. GWYTHER

July 23, 1963 V. M. GWYTHER 3,098,360
WATER QUALITY CONTROL MEANS
Filed Nov. 14, 1960 7 Sheets-Sheet 5

INVENTOR
VAL M. GWYTHE

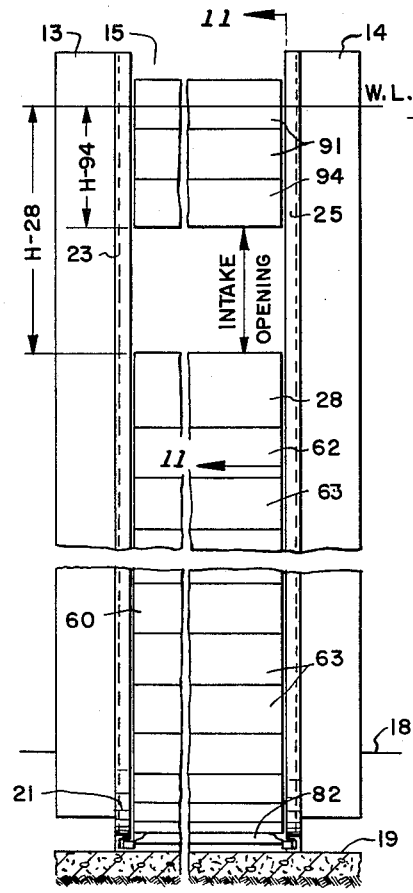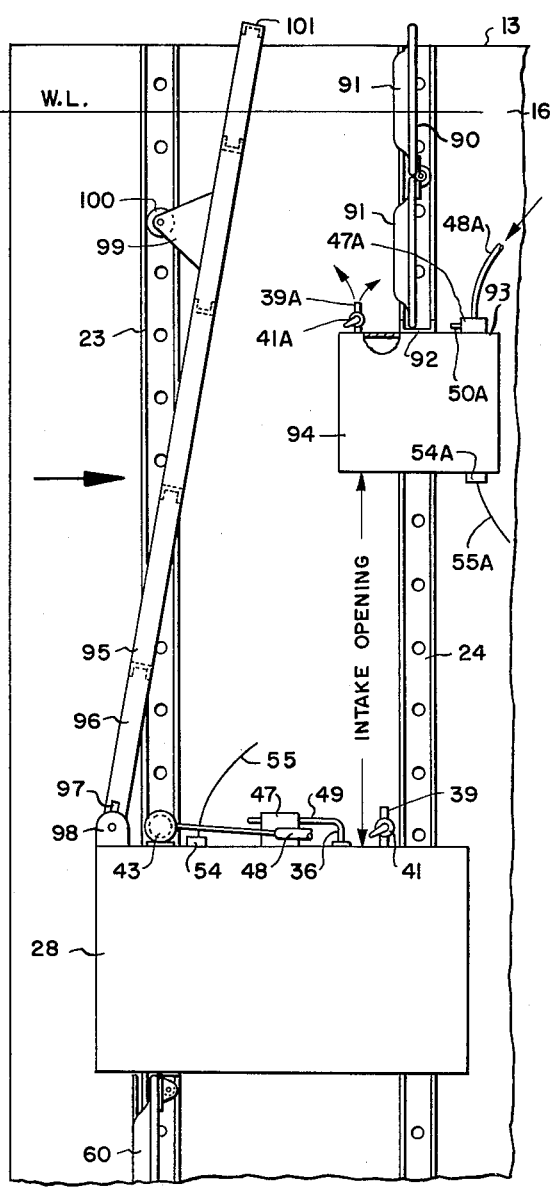

United States Patent Office 3,098,360
Patented July 23, 1963

3,098,360
WATER QUALITY CONTROL MEANS
Val M. Gwyther, 515 Granville St., Vancouver,
British Columbia, Canada
Filed Nov. 14, 1960, Ser. No. 68,978
3 Claims. (Cl. 61—28)

As is well known, the development of a watershed primarily for power purposes is often associated with marked decrease in fish yield. And conversely to preserve the full fish potential is commonly held to be incompatible with power development. My invention makes full watershed utilization possible. I attain this by providing means whereby the quality of the water being withdrawn from a reservoir, for example in hydro-electric installations, may be controlled.

Thus the objects of my invention generally are to provide withdrawal means to exercise control whereby the quality of the water being withdrawn, and the means of withdrawal, facilitate the passage downstream of migrating fish and, at the same time, are well adapted to power generation purposes.

Ancillary to this invention, forming the subject of separate application, are means for the collection and transportation downstream of migrating fish. These means are suitably installed immediately downstream of the subject invention and may be physically attached thereto.

Specific objects of the invention are:

To provide a cutoff membrane to prevent outward flow of the top waters of the reservoir.

To provide means of variable buoyancy to support the cutoff membrane whereby the depth of top cutoff may be varied.

To provide a flexible membrane spaced below the cutoff membrane to extend to exclude all of the bottom waters, the space between said membranes forming an intake opening whereby water passes to a forebay.

To provide means of variable buoyancy to support the lower flexible membrane whereby the same may be raised or lowered vertically.

To provide means whereby, the reservoir level changing, the flexible membrane may be urged along, or withdrawn from, an apron at the bottom of a forebay according to the level of the reservoir.

To provide means whereby the size of the intake opening may be made automatically to vary, in predetermined manner, with the variation in reservoir level.

To provide means whereby these various actions are controlled.

Other objects and advantages will be apparent as the disclosure proceeds.

Referring to the accompanying drawings:

FIGURE 10 is a small scale elevation of a passage showing the invention installed therein, the trash rack assembly removed.

FIGURE 11 is a part elevation seen from line 11—11 of FIGURE 10.

A broad arrow is used to indicate direction of stream flow, like characters of reference refer to the same parts throughout the drawings.

Figure 1:
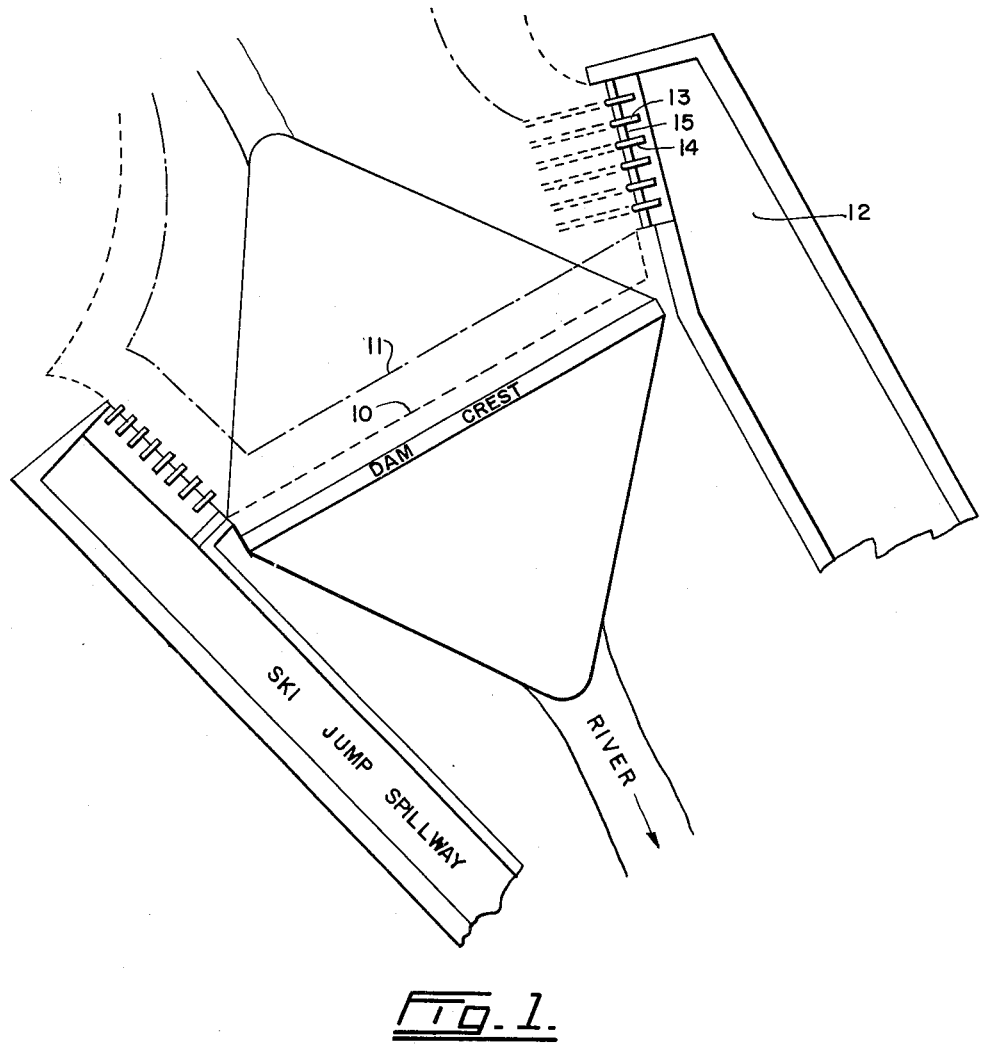
FIGURE 1 is a site plan showing the general relationship of the invention to a typical hydro project.

FIGURE 1 shows generally the installation of the invention in relation to a typical hydro electric power dam and ancillary works. The dam impounds water in a reservoir, the high water and low water lines of which are, respectively, shown by the broken lines 10 and 11. Difference in elevation between high and low water for example might be of the order of one hundred feet, and might greatly exceed this. The water of the pond passes through the forebay, indicated generally by the numeral 12, thence by diversion tunnel or other conventional means, to the power house.

Across that end of the forebay adjacent the pond are a series of spaced piers such as 13 and 14 defining a series of passages such as 15, through which the pond water passes to the forebay, thence to the power house. All of the water passing to the power house passes through said passages 15. When the amount of water in the reservoir is increasing at a rate faster than the power house water demand, level will rise. To prevent the impounded water rising past an arbitrary level, such as the HWL 10, conventional ski-jump spillway means are provided to deal with the excess.

Figure 2:
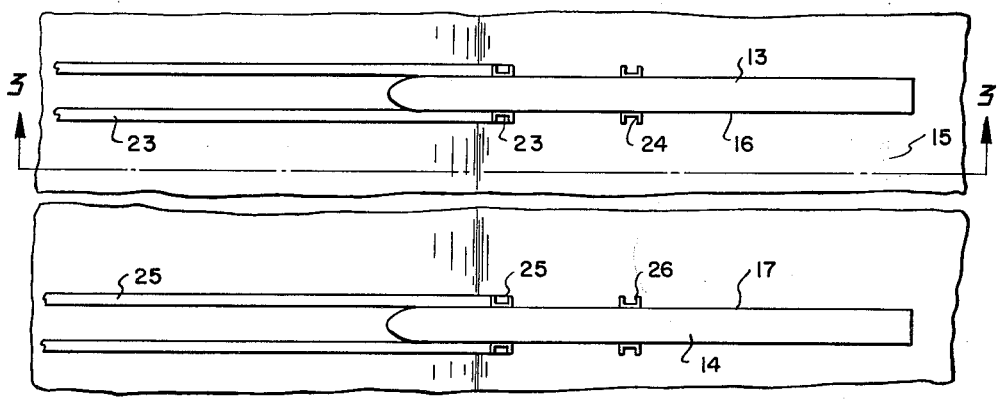
FIGURE 2 is a plan view showing two adjacent piers.
Figure 3:
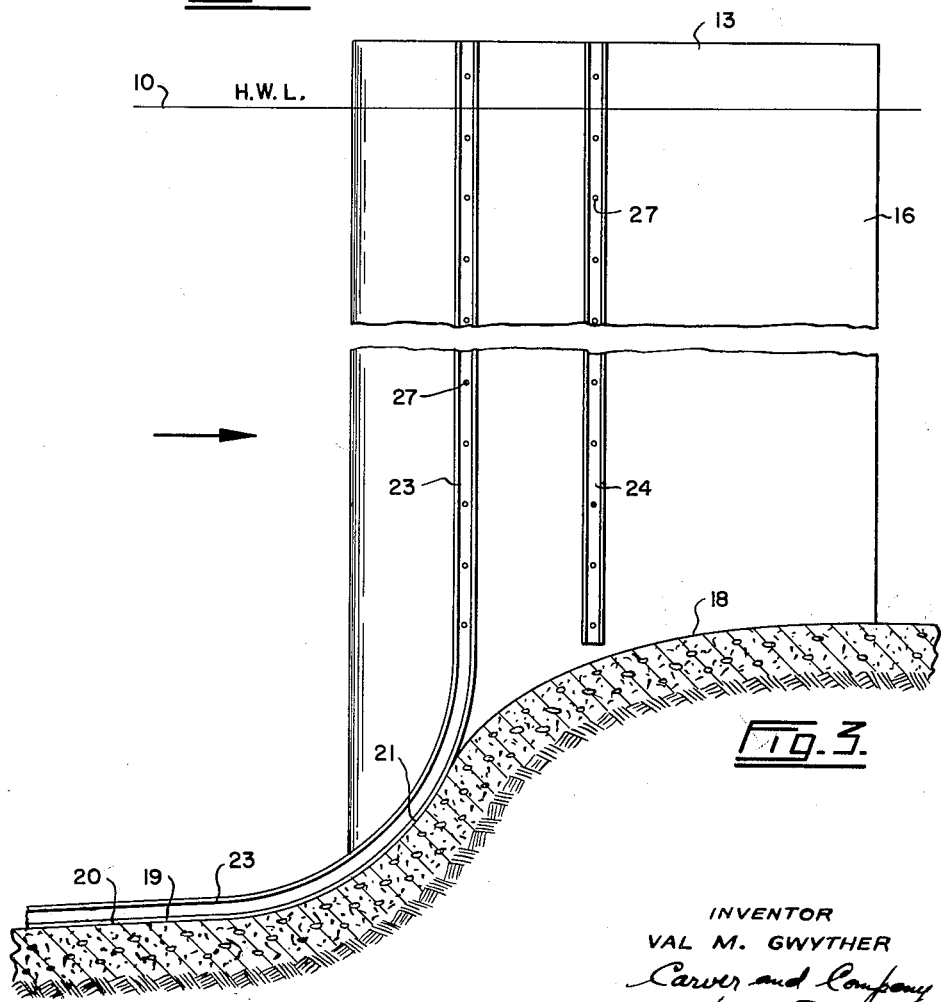
FIGURE 3 is a section on line 3—3 of FIGURE 2.

Referring to FIGURES 2 and 3, a said passage 15 is defined by pier side walls 16 and 17 and a portion of the forebay invert 18.

The forebay invert continues upstream to form an apron 19. Said apron extends beyond the piers along the reservoir bottom a distance somewhat greater than the difference between the high and low water levels aforesaid. As shown in FIGURE 3 apron 19 is suitably a plane surface at 20, and has a circular section at portion 21 tangential to the forebay invert. The invert and apron are of concrete of suitable thickness.

As shown in FIGURES 2 and 3, one sidewall 16 of said passage is suitably attached a channel member 23 flanges outward, which channel continues vertically down said pier sidewall curving to the circular portion 21 of the apron 19, and extending outwards along said apron substantially to its end. Channel 25 on pier sidewall 17 runs parallel to channel 23 the pair 23, 25 forming a track or guide.

Channel pairs 24, 26 are similarly attached to said sidewalls, forming a second track or guide parallel to the vertical portion of the outer track 23, 25, and downstream thereof. Track 24, 26 ends a short distance above the forebay invert as shown.

The web of each channel contains a row of uniformly spaced holes 27, central of the webs thereof. The purpose of these spaced holes is explained later.

A submerged pontoon 28, the buoyancy of which may be varied, extends substantially across the full width of a passage 15. Said pontoon is adapted to move vertically within the passage, restrained by the tracks or guides aforesaid.

Figure 4:
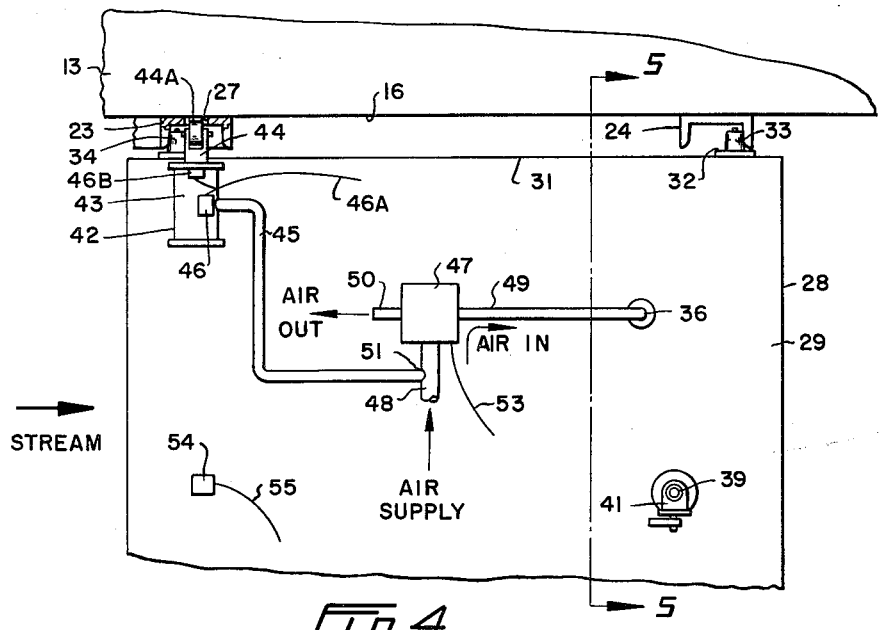
FIGURE 4 is a plan view of a fragment of a pontoon, shown in relation to a pier, the scale being enlarged.
Figure 5:
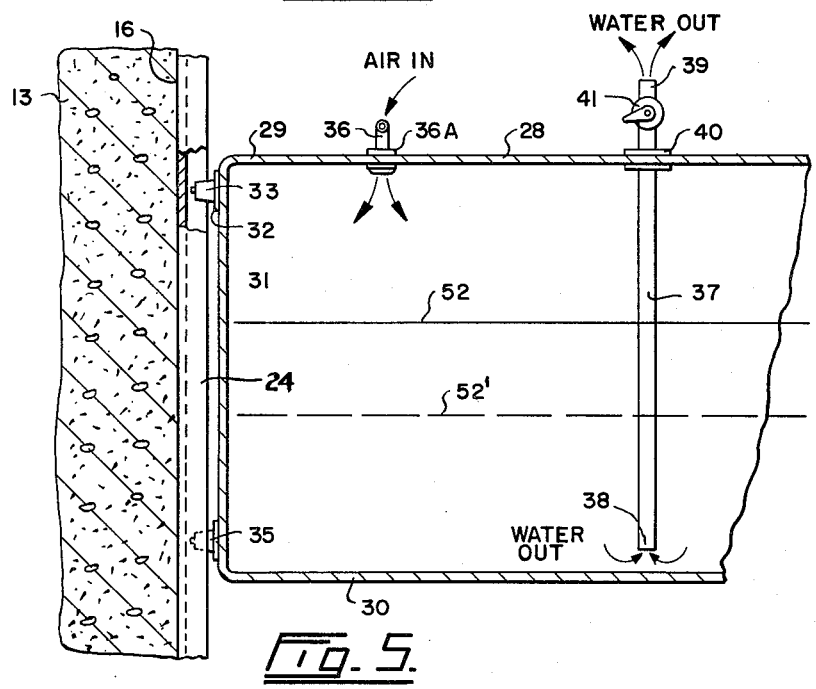
FIGURE 5 is a section on line 5—5 of FIGURE 4.

Referring to FIGURES 4 and 5, pontoon 28 suitably is of rectangular section having a top wall 29, a bottom wall 30, an end wall 31 adjacent a pier face 16, and an end wall adjacent a pier face 17 forming the remaining side of the passage aforesaid.

Attached to end wall 31 near the top wall 29 of the pontoon, is a bracket 32 bearing a roller 33 adapted to engage a flange of the channel 24. Another such roller is provided as shown at 34 to engage a flange of channel 23. A second pair of rollers, one of which is shown at 35 in FIGURE 5, is provided near the bottom wall 30. Similarly, four such rollers are provided on the end wall adjacent pier face 17, which last mentioned rollers engage channels 25 and 26 on pier face 17. Thus pontoon 28 may move vertically restrained by said rollers cooperating with said channels. Mounted on the top wall 29 is an air intake line 36 with suitable airtight gland 36A, which air intake communicates freely with the interior of said pontoon.

Passing through the top wall 29 is an outlet pipe 37 having an open end 38 a short distance above the bottom wall 30, as shown. The upper end 39 of pipe 37 protrudes a distance above the top wall 29, and gland 40 is adapted to make the joint between pipe 37 and wall 29 airtight. A shut-off valve 41, normally in open position, is placed between 39 and 40 as shown. When said valve is closed water may not pass through pipe 37.

Also mounted upon top wall 29 centrally opposite channel 23 is a locking means indicated generally by the numeral 42, comprising a double acting air cylinder 43 having a piston rod terminating in the roller 44A the axis of which roller is transverse the length of said channel 23, an air supply line 45, a solenoid operated control valve 46 controlled electrically by the cable 46A, and normally off limit switch 46B adapted to close an electrical circuit when said piston rod is fully extended outwards. Valve 46 is conventionally adapted so that, according to the position in which said valve is set, piston rod 44 may be urged outward causing the roller 44A thereof to press against the web of said channel, or withdrawn clear of said web. As has previously been stated, said web contains a number of regularly spaced holes 27 drilled centrally therein, diameter of said holes being greater than the piston rod and roller aforesaid so as freely to admit the same without close register being attained. Thus, when 44 is urged outward, as explained, pontoon 28 will not be locked but, because of the roller 44A, may still move vertically until one of the said holes is reached when 44 will move further outward engaging a said hole, so locking the pontoon against further vertical motion. In this position, limit switch 46B closes. Valve 46 is operated to withdraw 44, unlocking the pontoon so that it again is free to move vertically. As 44 is so withdrawn, limit switch 46B opens. Obviously, additional locking means such as 42 may be added and ordinarily at least four, one to engage each said channel, are provided securely to lock the pontoon, and to prevent undue strain arising in the locked position. The positions of the said holes 27 in each channel are such that all four locking means may simultaneously engage, the pontoon being horizontal.

Attached to the pontoon top wall 29, conveniently in a position such as shown in FIGURE 4, is the solenoid operated air valve 47 having an input port to which is attached the air supply line 48, an air output 49 to which is attached pipe 36 aforesaid, and having the release port 50.

A T 51 in air suply line 48 supplies air to the locking means air line 45 aforesaid.

Solenoid actuated valve 47 has three positions, obviously adapted so that: in position 1 air from the supply line 48 passes directly through valve outlet 49 thence to the pontoon air pipe 36, outlet 49 being closed in all valve positions except position 1; in position 2 the valve 47 is closed; in position 3 outlet port 50 communicates freely with the interior air space of pontoon 28; which actions are indicated in FIGURE 4 by arrows so marked.

Buoyancy control is effected as follows: To increase buoyancy, water level within the pontoon being at, say, the level 52, electrical current is caused to pass through the cable 53 so as to place valve 47 (previously in the closed position 2) in position 1, whereupon air under suitable pressure will enter 36 as shown by the arrows of FIGURE 5 causing water to be forced out of the pontoon through the open end 38 of the pipe 37, to discharge to the outside water at 39. When the desired buoyancy is attained, corresponding for example to water level within the pontoon as shown at 52′, valve 47 is caused to close to position 2 whereupon, since outlet 49 is closed in position 2, the interior water will come to rest at a new level. For the above action to take place, air pressure from supply pipe 48 must exceed the hydrostatic pressure encountered. If maximum anticipated depth of the pontoon is, for example, sixty feet, then a pressure of fifty pounds might be used. Greater pressure could be used to result in more rapid ejection of water from the pontoon. To decrease buoyancy, valve 47 is similarly placed in position 3, whereupon the entrapped air will escape through the port 50 being displaced by water entering through the pipe 37. Upon closing 47 to position 2, the water within the pontoon will again come to rest at a higher level corresponding to the decreased buoyancy.

A manometer 54 is placed at a convenient position on a top wall 29 of pontoon 28 suitably actuating a remote gauge (not here shown) by electrical means through the cable 55. Said manometer gauge indicates depth in feet below passage water level. The foregoing arrangements are conventional.

Figures 6, 7, 8:
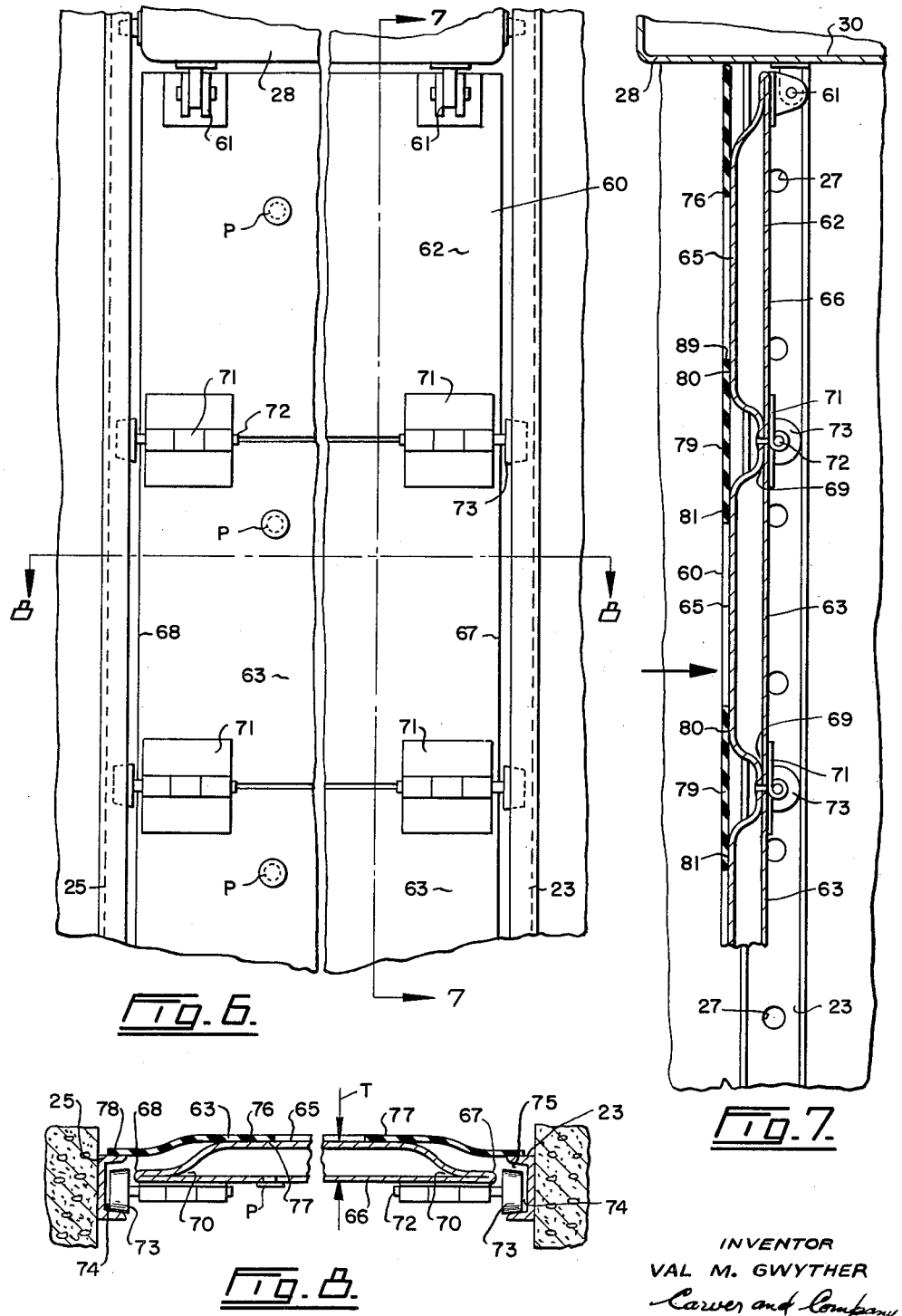
FIGURE 6 is a fractional elevation showing a part of a flexible sectional membrane.
FIGURE 7 is a section on line 7—7 of FIGURE 6.
FIGURE 8 is a section on line 8—8 of FIGURE 6.

As best shown in FIGURES 6, 7, and 8, a flexible sectional membrane 60 is attached by obvious hinge means 61 to the bottom wall 30 of the pontoon 28. Said membrane consists of a top hollow section 62 and intermediate hollow sections 63. All said sections are rectangular and conveniently of the same size and shape having a dished front wall 65, a plane rear wall 66, and sides 67 and 68. Front and rear walls are suitably of steel plate the composition of which is adapted to withstand immersion for lengthy periods—say for some fifty years or more—without failure from rust, corrosion, and similar causes. Front and rear walls are conventionally welded or otherwise joined at 69 and 70 to form hollow water-tight elements.

Top section 62 is hingedly joined to adjacent intermediate section 63, and succeeding intermediate sections hingedly joined to one another, by hinge means 71. Said hinge means have a pin 72, best seen in FIGURE 8, extending outwards towards a pier face to form an integral shaft portion upon which is journalled a roller 73 adapted to engage a flange of a channel such as 23 attached to a pier face as aforesaid. Said pin and roller are obviously restrained from axial motion with respect to a hinge. Dimensions of said roller and the position in which it is secured are such as to provide end clearances 74, and side clearances 75, so that the flexible sectional membrane 60 may move freely, without binding, within the rails or guides 23, 25 aforesaid.

The thickness of section being T, as shown in FIGURE 8 only, T may be 15.7G where G is the gauge of the steel plate of which a section is formed. For example, with ⅜ inch plate T would then be 5.9 inches when the total weight (in air) of a section, plus ancillary hardware and flanges, would exceed the weight of water displaced by a totally immersed section, by the weight of the said ancillaries. That is, such a section immersed in water would have small residual weight.

This thickness, 15.7G is satisfactory in some smaller installations, but, particularly where the distance between piers is larger and with anticipated differences between high and low water of the order of one hundred feet or more, strength considerations require T to be greater when each section is provided with an obvious plug P, by means of which water is added within a said section, before assembly, to remain therein. Thus the total weight of a said section, inclusive of ancillaries and permanently enclosed water, may be made at will to be greater than, or less than, the weight of water displaced by it when totally immersed.

For reasons later to be explained, in some installations, each such section will be given the same weight to result either in slight positive or slight negative buoyancy.

In other installations, it will be provided that each section shall progressively have total weight greater than, or less than, that of a section adjacent.

Flashing 76 extends throughout the length of the membrane 60, on each side thereof. It is bonded to each section front wall 65 as indicated at 77, extending unsupported across the horizontal joints between said sections. The free edge 78 of said flashing bears against the outer flange of a channel 23, 25. Similar flashing 79 covers the joints between said sections, and is bonded at 80 to a front wall 65, the face edge overlapping said joints as shown at 81. Flashing 79 butts against flashing 76.

The said flashings are known as fish flashing, the purpose is to make a movable joint which is substantially fish tight, but which need not be watertight.

See now FIGURES 3 and 10, the total length of the membrane 60 is such that at the highest operating HWL position of pontoon 28, the membrane shall extend into the curved portion 21 a short distance beyond the point of contact thereof with the forebay invert.

Figure 9:
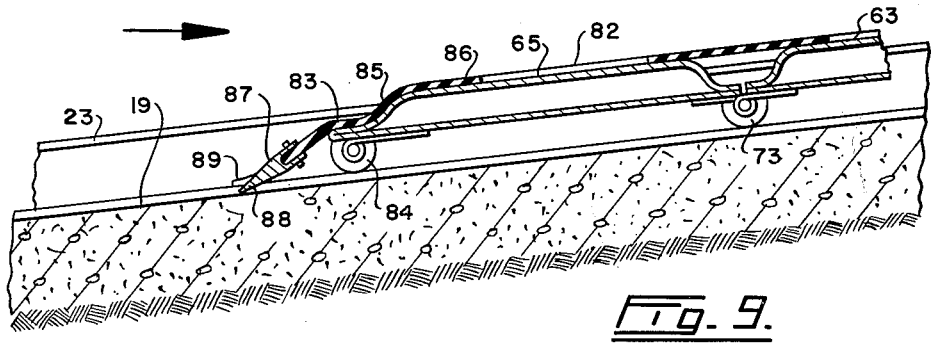
FIGURE 9 is a sectional elevation of a terminal section of a flexible sectional membrane.

In FIGURE 9 is shown the terminal hollow section 82 of the flexible membrane. The position illustrated is with a reservoir level intermediate between high and low water when the end of said membrane will extend past the forebay invert of a passage 15, along the apron. The lower end 83 of the said terminal section is provided with a roller 84 obviously similar to the roller arrangement 73 before described. Suitable heavy flexible moulded flashing 85 is bonded to the dished portion of front wall 65 as indicated at 86, which flashing 85 is provided with a steel scraper blade 87 having a portion 88 which is urged into contact with the apron for the full width, less a suitable clearance, between channel flanges, and a portion 89 similarly adapted to bear upon the inner flange of the channel 23 as shown. Said scraper blade will, as it moves with the terminal section 82, serve to scrape the apron, and that portion of the channel flange upon which said rollers run, so as to remove, and to inhibit the accumulation of, various aquatic deposits.

In FIGURE 11 is shown an adjustable depth cut off membrane 90 consisting of a number of hollow sections 91 each of which desirably is of the same size so as to be interchangable with, sections 63 etc., of the flexible membrane aforesaid. The lower said section rests in a suitable channel 92 on the top wall 93 of a pontoon 94 of variable buoyancy. Buoyancy of pontoon 94 is controlled by means as described with reference to pontoon 28, namely to increase buoyancy air is admitted by valve 47A from an air supply line 48A to drive water out of the pontoon through 39A. In decreasing buoyancy water enters through 39A displacing air which escapes through the port 50A of the valve 47A.

Similarly, pontoon 94 has a manometer 54A, energizing a remote gauge through the cable 55A.

In section, said pontoon is suitably rectangular having such sectional area as required to provide the necessary buoyancy range.

Said pontoon 94 extends the full width, less suitable clearance between the channels 24 and 26, forming rails or guides aforesaid, upon pier faces 16 and 17. It is provided with obvious rollers to engage said guides, which rollers are central of the said pontoon, so that it may travel vertically of the guides in the position shown in FIGURE 11. These rollers are not shown. As has been stated, sections 91 are suitably of the same size as the sections of the membrane 60, and have small negative buoyancy. Said sections 91 are obviously guided to travel vertically within the said tracks or rails.

FIGURE 10 shows two sections in place, should it be required to lower 94 to such depth that top section shown is entirely submerged, a third section is inserted. Conversely, as 94 is raised until the upper section shown in FIGURE 11 is entirely above water level, that section may be removed.

Flashing is not provided for cutoff membrane 90. Upstream of the cutoff membrane is a conventional rectangular trash rack frame 95 side members 96 of which suitably are forked as indicated at 97 to engage a suitable co-operating socket 98 at the upstream edge of the top wall 29 of the pontoon 28. Said frame is of the full width between rails or guides 23, 25 aforesaid less suitable clearance. A bracket 99 attached to a side member 96 has a roller 100 adapted to engage a flange of a channel 23 aforesaid. The point of attachment of 99 is such that, at highest high water of the reservoir combined with the least depth therebelow at which pontoon 28 might be operated, roller 100 shall be some distance below the upper end of a channel 23. In that position, bracket 99 is such that said frame has rake as shown, suitably 1:12.

Length of frame side members 96 is such that at the greatest depth below reservoir water level pontoon 28 may be operated, upper edge 101 of the frame shall be somewhat above water level. Conventional trash rack bays are obviously inserted in said frame, in such number as may be required to extend above the reservoir water surface.

Figure 12:
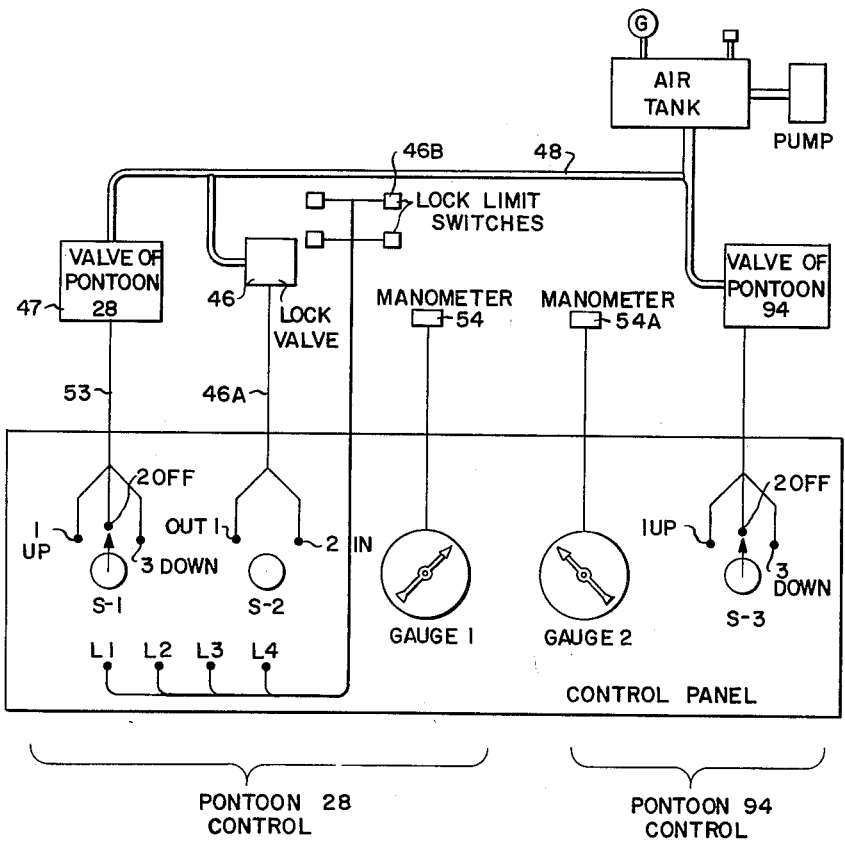
FIGURE 12 is a block diagram of control and air supply means.

Operation of the pontoons is suitably from a control panel diagrammatically illustrated in FIGURE 12, which figure also shows suitable air supply arrangements.

An air pump maintains air at suitable pressure, say about three atmospheres, in a tank which may be provided with a relief valve and a pressure gauge. From said tank air is supplied to the air line 48 leading to valve 47 and locking means valve 46, of pontoon 28, and to the air line 48A leading to valve 47A of pontoon 94. It is obvious that, except for those parts of the system which, suitably, are on the top of a pier, the said air lines will be flexible and of such length as shall permit the necessary motion of the pontoons. The foregoing remarks apply also to the electric cables leading to the solenoid actuated valves and to the manometers.

It will also be understood that similar air supply arrangements will be required for each passage, and that one tank may serve the pontoons of several passages. The foregoing air supply arrangements are conventional.

Elements of a control panel related to pontoon 28 are the three position switch S-1, the two position switch S-2, lock engagement indication pilot lights L1 through L4, and gauge 1. S-1 to control pontoon valve 47, has three positions, position 1 admitting air to the pontoon, position 2 closing said valve, position three permitting water to enter the pontoon, as has been explained. Switch S-2 controls locking means valve 46A, in position 1 locking means piston rod is urged outwards, and in position 2 said rod is urged to return inwards to unlock, as has been explained. Four lock limit switches, as 46-B are shown. Each controls a pilot lamp L-1 etc., so that the same shall light when the locking means piston is fully outward engaging a hole 27, thus there is positive indication of actual engagement of each locking means with a hole 27. Gauge 1 conventionally energized by electrical means, by the pontoon 28 manometer 54 and said gauge is graduated in feet of water as has been explained.

Pontoon 94 is controlled by switch S-3 similar to S-1, and gauge 2 indicates depth in feet of water.

Gauge 1 directly reads H-28 the level of the top wall of Pontoon 28 (see FIGURE 10) and gauge 2 reads H-94 of the bottom wall of pontoon 94, whence the actual intake opening is given by the difference between the two readings. A third instrument obviously adapted directly to read this difference may be added to the panel.

It is posesible that the pontoons of all passages be controlled from one panel such as is shown in FIGURE 12, separate controls for each passage are preferred so that any one may be controlled individually to facilitate maintenance or repair. Said panels may be located in any any convenient position at the site, or elsewhere as may be expedient.

Figure 13:
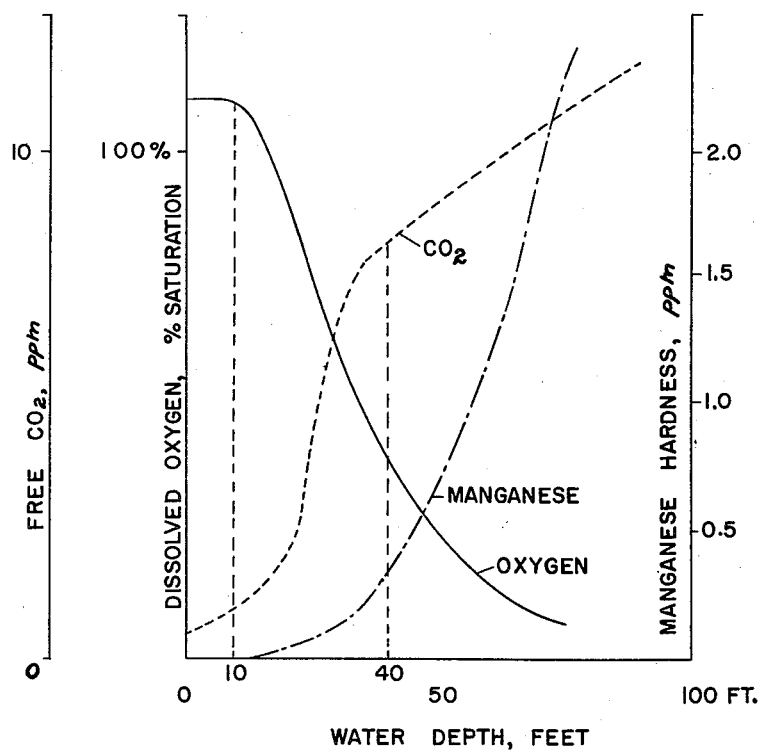
FIGURE 13 is a series of graphs showing certain water qualities against water depth.

Some factors of water quality are, dissolved oxygen content, free $CO_2$ content, and hardness. Typically, dissolved oxygen content decreases, and free $CO_2$ and hardness increase, with depth. This is illustrated in FIGURE 13 showing conditions prevailing at a particular time in a particular reservoir. The three curves show, dissolved oxygen in percent of saturation, free $CO_2$ in parts per million, and manganese hardness p.p.m. It will be understood that there are secular and diurnal variation in these and in other relevant properties. Periodic sampling sections are taken in the particular reservoir, and from these data diagrams such as FIGURE 13 may be constructed, from which, suitably an aquatic biologist, may establish critera to be used to determine the optimum position and magnitude of the intake opening, see FIGURES 10 and 11, that is H–28 the required reading of gauge 1, H–94 the requiring reading of gauge 2. The pontoons 28 and 94 are then set to these depths in the manner described.

My invention has for an object means to accomplish particular settings, as above, given the (optimum) values of the said settings.

The application of information such as that of FIGURE 13 to determine the said settings need not therefore be explained in detail herein. The brief generalized description following is given in further explanation to facilitate understanding of the operation and advantages of my invention.

For the condition of FIGURE 13 the top ten feet are supersaturated with oxygen. This is harmful to migrating fish if they are exposed thereto for any length of time. Consequently the cutoff membrane may be set to a depth of ten feet for these conditions.

If the lower pontoon 28 be set to forty feet, the oxygen content of the water drawn off will be the mean height of the oxygen curve between ten and forty feet— that is to say some 70 percent. Because of mixing, this content will tend to a more nearly uniform distribution downstream of the intake opening. Moreover, the fish will be subject thereto for but a short time only, since they will quickly reach the collecting and transportation means immediately downstream, wherein aeration takes place increasing the oxygen content. By cutting off the water below forty feet, it is seen that the $CO_2$ content has remained within reasonable limits.

Referring particularly now to manganese hardness, while not necessarily harmful to fish, very small concentrations of 0.2 to 0.3 p.p.m. may form heavy incrustations in piping, and even smaller amounts may form noticeable deposits. In the example under discussion, the forty foot cutoff results in desirably low manganese content. Thus I have improved water quality from the point of view of power operation as well.

Vertical water temperature gradient and other factors are involved as affecting the determinating of optimum settings.

In frazzle ice conditions, as for another example, H–94 should be about fifteen feet, and pontoon 94 is set to that level preferably in advance of probability of such conditions as indicated by meteorological information. This factor is related to power rather than to fish migration.

As the reservoir level changes, the upper pontoon 94, and with it the cutoff membrane 90, will remain at the set depth below that level.

Having reference to the flexible sectional membrane 60, it has been explained that each section thereof may have small negative buoyancy, or residual weight when submerged. In this construction, with fall in reservoir level lower pontoon 28 too will fall, and with it the flexible sectional membrane 60 will be lowered and will be urged to roll on the tracks 23, 25 to extend along the apron 19. Each such section of the membrane 60 has a residual weight, and as these residuals are progressively supported by the substantially horizontal apron the downward load upon pontoon 28 decreases. Thus automatically, an intake opening set at a high water level will decrease as that level falls. From the discussion of quality above, it is seen that this reduction may generally be desirable.

In installations for conditions or sites where automatic decrease of intake opening with fall in reservoir level is generally undesirable, I provide that the lower sections of said membrane have lower or negative residual weight, to reduce or to reverse the effect.

To summarize the automatic effects obtainable, by having all sections with a residual weight, the intake opening will decrease as reservoir level falls. The amount of this decrease will depend upon the amount of said residual. When all sections, or particularly the lower sections, have positive buoyancy then, as reservoir water level falls the intake opening will become smaller, the amount of decrease depending upon the buoyancy. Obviously, by suitably weighting each section with added water, I can provide, for example, that the intake opening shall remain at substantially constant size during initial fall to increase or decrease thereafter. For use in installation, and in repairs and maintenance, obvious winch means, not shown, are provided upon the top of each pier, and the top lengths of the channels 23, 24, 25, 26—see FIGURES 2 and 3—are preferably bolted or otherwise obviously secured to said piers, rather than permanently attached thereto, so that they may be removed to facilitate installation, repair, and maintenance.

Locking means 43 of pontoon 28, see FIGURE 4, are for use in these circumstances, and there may be other conditions where locking is desirable. Locking is effected by turning S–2 (FIGURE 2) to position 2 causing piston rod 44 to be urged outwards, so that roller 44A thereof, is in contact with a flange of a channel 23 as has been explained. Except by chance, the rod will not be in register with a hole 27, it will thus ordinarily be necessary to inch pontoon 28 until the said piston rod engages a hole. Pilot light L1 will immediately light, as has been explained, upon this being effected.

To unlock, place switch S–2 (FIGURE 12) in position 2. It is unlikely that said rod will immediately withdraw as there may be expected to be some lead upon the rod, particularly if there has been change in reservoir level since locking. Thus the buoyancy of pontoon 28 should be slightly increased, or decreased as the case may be, to release said load whereupon rod 44 will immediately withdraw unlocking the pontoon, and this will be indicated by the pilot light (FIGURE 12) going out.

When it is necessary to surface pontoon 28 for any cause, such as for example repair or maintenance, valve 41 FIGURE 5, should be closed. Valve 47, also being in the closed position, there is not danger of sinking from water accidentally entering the pontoon. Valve 41A of pontoon 94, FIGURE 11, is for the same purpose.

The invention is capable of a number of modifications and alternative constructions. I have shown in the drawings and described hereinabove a preferred embodiment. It is however to be understood that my invention is not limited thereto, but is intended to cover such modifications and alternate constructions as fall within the spirit and scope thereof as expressed in the description, illustrated by the drawings, and as set forth in the appended claims.

What I claim as my invention is:

1. Water quality control means within a passage through which water passes from a reservoir to a forebay, said water having a surface, the passage defined by vertical sidewalls and an invert, said means comprising in combination the following elements to form an intake opening of variable vertical dimension at a variable depth below the surface aforesaid, (a) a first pontoon, submerged at a variable depth below the surface and extending horizontally across the passage to close it, the pontoon having a top wall, a bottom wall, and end walls closely adjacent to the passage sidewalls, said pontoon slidable vertically within the passage, (b) a cutoff membrane attached to and supported by the top wall of the first pontoon extending upwards thereof, the membrane extending across the passage to close it, the said membrane slidable vertically in channel members attached to the passage sidewalls, (c) a second submerged pontoon similarly mounted and disposed below the first pontoon, (d) a flexible sectional membrane attached to and dependent from the bottom wall of the second pontoon, the membrane extending across the passage to close it, said membrane slidable vertically in channel members attached to the passage sidewalls, (e) means independently to vary the buoyancy of each pontoon whereby each may be submerged to a variable depth below the surface, the bottom wall of the first pontoon defining, with the top wall of the second pontoon and the passage sidewalls, the intake passage aforesaid, the said means including for each pontoon a valve, a supply line containing air under pressure attached to the valve, said valve adapted selectively to admit water to the interior of the pontoon, to close, and to admit air under pressure to the interior of the pontoon to displace the water therein.

2. Water quality control means as claimed in claim 1, means to lock each said pontoon in fixed relationship to at least one passage sidewall, the locking means to comprise at least one member mounted vertically on one passage sidewall, a series of spaced vertically aligned holes in the member, attached to each pontoon adjacent one vertical member aforesaid a cylinder, having a piston rod cooperating with said cylinder, the rod terminating in a roller, means to urge said rod outwards of the cylinder to engage one hole so locking said pontoon in fixed relationship to the passage sidewall, means to withdraw said rod from engagement with the hole so unlocking, the said cylinder having a valve adapted to admit air thereto so as to cause the piston rod to engage and withdraw as aforesaid, solenoid means to actuate said valve, remote means to energize said solenoid.

3. Water quality control means as claimed in claim 2 and a normally off limit switch cooperating with each said piston rod adapted to close when the rod engages a hole aforesaid and to open upon disengagement of the rod from the hole, remote indicating means electrically connected to each limit switch, a manometer in fixed relationship to each pontoon, and remote electrical indicating means cooperating with the manometers.

References Cited in the file of this patent
UNITED STATES PATENTS

| | | |
|---|---|---|
| 1,986,701 | Zimmerman | Jan. 1, 1935 |
| 2,023,944 | Zimmerman | Dec. 10, 1935 |
| 2,984,986 | Hill | May 23, 1961 |

FOREIGN PATENTS

| | | |
|---|---|---|
| 338,545 | Germany | June 23, 1921 |
| 139,897 | Austria | Dec. 27, 1934 |
| 181,569 | Austria | Apr. 12, 1955 |
| 544,417 | Canada | Aug. 6, 1957 |
| 1,068,189 | Germany | Oct. 29, 1959 |